Dec. 28, 1965   W. E. LOWREY   3,226,080
BALL VALVE SEAT
Filed May 17, 1965
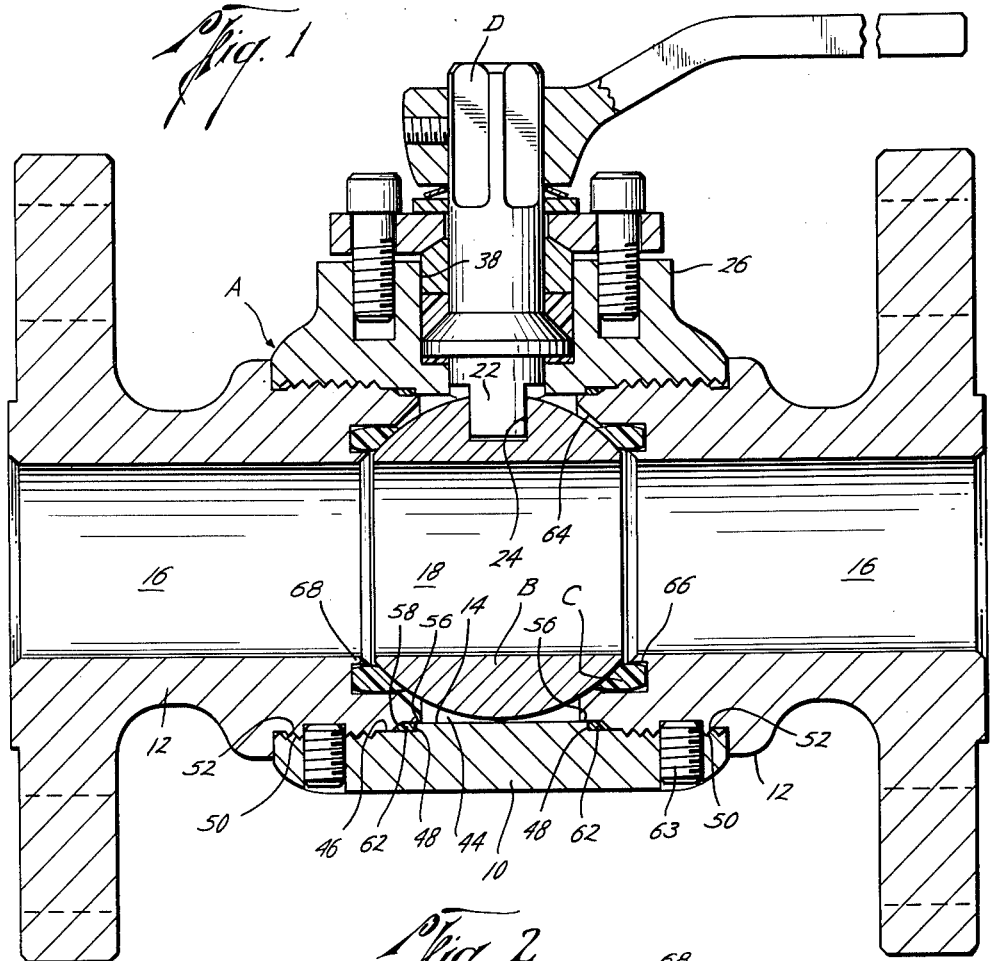
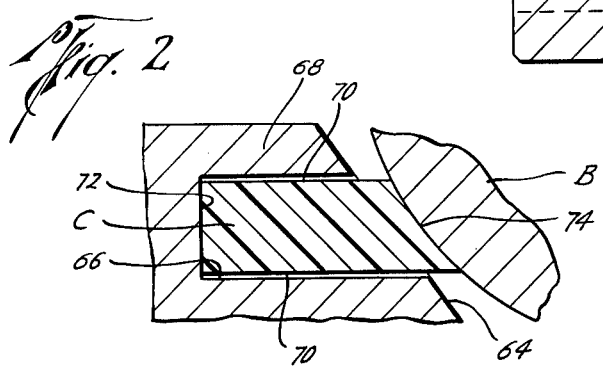
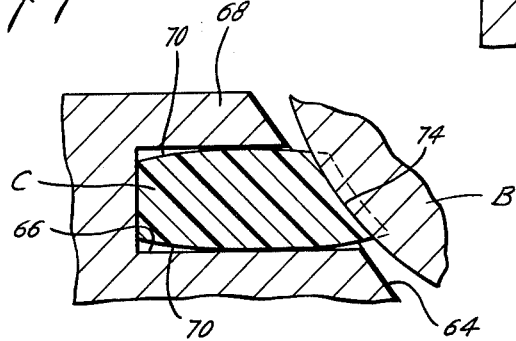
William E. Lowrey
INVENTOR.
BY Russell E. Schloff
ATTORNEY

United States Patent Office 3,226,080
Patented Dec. 28, 1965

3,226,080
BALL VALVE SEAT
William E. Lowrey, Houston, Tex., assignor to ACF Industries, Incorporated, New York, N.Y., a corporation of New Jersey
Filed May 17, 1965, Ser. No. 459,519
5 Claims. (Cl. 251—309)

This application is a continuation-in-part of my copending application, Serial No. 192,767, filed May 7, 1962, now abandoned, and titled Ball Valve Seat.

This invention relates to spherical plug valves or ball valves, as they are more commonly known, and more particularly to a seat construction therefor.

Basically, a ball valve is relatively simple. It is essentially comprised of a valve body, a rotatable ported valve member, and one or more seat members. The seat members are located between the valve member and portions of the valve body. One common type of construction, customarily referred to as end entry type, utilizes one or more annular detachable end members to complete the body assembly. The end members are insertable into a bore in the body and detachably connected to the body. In such construction, the seat member is usually carried by the end member. The end member's entry into the body forces the seat members into intimate sealing contact with the spherical surface of the valve member. In effect, the seat members are placed under load which establishes the initial seal for the valve.

It has been found that confining the seat permits the extrapolation of the valve to larger sizes and greater pressure ranges. Also, having the seat confined directs the flow past the back of the seat thereby eliminating the blowing out of the unsupported portion of the upstream seat during operation. However, it was noted that the torque required to operate such valves was, in some instances, a little higher than desired.

In typical floating ball valves, the seat member is frequently the same size as its pocket. Accordingly, as the valve was made up on assembly, interference develops between the seat member and valve member with the resultant force reacting against the valve member causing a turning torque of relatively high value. This is apparently caused because the seat member is confined and has no place to flow and therefore the valve will become hydrostatically locked transferring the forces resulting from the interference between the seat and valve member into a resultant force reacting against the valve member, which force has to be overcome before the valve member can be turned.

It is the principal object of the present invention to provide a ball valve, having confined seats, which has a relatively low turning torque.

It is another object to provide a ball valve having confined seat members which do not hydrostatically lock.

It is a further object to provide a ball valve having confined seats of deformable material, which seats independently carry the load of the plug member developed by assembly of the valve and the load imparted to the plug member by the line fluid during operation.

Briefly, the valve body is provided with a bore extending therethrough for communication with a pipe system. A ported spherical valve member is positioned in the bore for controlling the flow of fluid through the valve. In order to turn the valve, a stem is provided. The stem has an axial inner end which is in engagement with the spherical valve member and an axial outer end which extends through an aperture in the valve body. Means are provided to form a seal between the stem and the aperture through which it extends. End members, each having a passage, extend into each end of the body bore. Means are provided to disengageably connect the end members to the body and form a seal between the body and end member. The axially inner end of each end member has a portion having a frusto conical surface which taperingly diverges from the central passage and in which surface is located an annular groove. The inner circumferential wall of the groove is spaced from the passage to provide a wall between the passage and groove. A seat member of deformable material is located in the groove. The seat member is of a lesser radial thickness than the radial thickness of the groove so that there is a clearance between the seat member and each of the side walls of the groove. The seat member has a portion extending beyond the surface of the taperingly diverging portion which terminates in a tapered surface opposing the spherical surface of the valve member. The inward movement of each end member upon assembly of the valve is sufficient to force each of the seat members into intimate contact with the spherical surface of the valve member forming an initial seal between the valve member and the seats. The inward movement is limited so that the seat member does not completely fill the seat cavity and hydrostatically lock, therefore, the seat member acts as a columnar spring. The seat member, being resilient, will be compressed axially by the plug member a slight amount during assembly and a significantly greater amount when the plug is forced against the downstream seat by the pressurized line fluid. Upon subsequent diminishing of line pressure, the compressed downstream seat will expand axially, thereby forcing the plug member to its originally centered position in the valve housing and causing slight recompression of the upstream seat. This condition exists up through the maximum rated pressure of the valve. As a result, due to the resiliency within the seat and valve member, the torque necessary to turn the valve is kept to a minimum level.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purposes of illustration and description and are shown in the accompanying drawings, forming a part of the specification, wherein:

FIG. 1 is a cross-sectional view of a ball valve constructed in accordance with the teachings of the present invention.

FIG. 2 is a fragmentary enlarged cross-sectional view of the valve of FIG. 1 showing the seat and its pocket arrangement prior to assembly.

FIG. 3 is a view similar to FIG. 2 after assembly.

Referring now to the drawings, it can be seen that the ball valve therein illustrated is comprised generally of a valve body A, a spherical valve member B, a pair of seat members C—C, and a stem D with which to rotate the valve member B.

As can be seen in FIG. 1, the valve body A is formed of a central annular housing 10 and two annular end members 12—12 which are disengageably connected to the annular housing 10. The annular housing 10 has a bore 14 extending therethrough, a portion of which forms a valve chamber in which is positioned the spherical valve member B. The two end members 12—12 are provided with passages 16—16 the axes of which are concentric with the axis of the bore 14 when end members 12—12 are attached to the housing 10. The spherical valve member B is provided with a port 18 which is alignable with the passages 16—16 in the open position of the valve to form the run of the valve. The axis of the port 18 is concentric with the axis of the bore 14 when the valve is in the open position. The port 18 may be the same size as the passages 16—16 as is shown in the drawings, or may be smaller for a venturi design as is well known in the art. In order to rotate the spherical valve member B, the stem D is provided.

The stem D has a cylindrical axial inner end which terminates in a rectangular tongue 22 for engagement with a slot 24 in the spherical valve member B. The slot 24 runs transverse to the port 18 so that in the closed position of the valve the valve member B will, in effect, be free floating. The housing 10 has a boss 26 which is provided with a bore 28 through which the stem D extends. Means are provided to form a seal around the stem and the bore.

As previously mentioned, the end members 12 are detachably connected to the central housing 10. In the smaller size valves the detachable connection may be a threaded connection as shown in FIG. 1. In such case, the bore 14 of each end member 12 is made up of a central portion 44 and end portions 46—46. The diameter of the central portion 44 is slightly smaller than the end portions 46—46 whereby shoulders 48—48 are formed between the central portion 44 and end portions 46—46. The terminus of each end portion 46 is provided with female threads 50. In order to engage the end member 12 with the central housing 10, the end member is provided with a male threaded portion 52 which engages with the female threaded portion 50 of the central housing 10. Axially outward of the male threaded portion 52, each end member 12 is provided with a flange 54 which contacts the end of the housing 10 when the end member is in full engagement. The flange 54 limits the amount of entry of the end member 12 into the central housing 10 and controls thereby the interference between seats C—C and valve member B as will be more fully explained subsequently. Axially inward of the male threaded portion 52 the end member angles radially inward and then terminates in a straight portion 56 which is slightly smaller than the central portion 44 of the housing 10. The straight portion 56 slightly overlies the central portion 44. The angular portion 58 is spaced axially outward of the shoulder 48 whereby a space 60 is formed in which is located a gasket 62 forming a seal between the body 10 and end members 12. In order to lock the end member 12 in position, the body may be provided with a threaded aperture wherein a threaded member 63 is engaged. The threaded member 63 contacts the end member 12 and prevents rotation thereof. The axially outer end of each end member 12 is formed with the necessary formation to enable the value to be positioned in a flow system as is well known in the art. In larger size valves, above 2", the end members may be bolted to the body member.

The axially inner end of each end member 12 has a portion 64 which taperingly diverges from the passage 16. An annular groove 66 is located in the taperingly diverging portion 64. The axis of the groove 66 is concentric with the axis of the passage 16. The inner circumferential wall of the groove 66 is spaced from the passage 16 to provide a wall 68 between the passage 16 and the groove 66. Positioned in the groove 66 is the annular seat member C.

The seat C is formed of a material having the following qualifications: impervious to inner leakage; flexible enough to conform to the spherical surface of the valve member; resistant to fluids likely to be carried by the valve; sufficient internal stiffness and strength to resist excessive distortion and to resist being blown out during operation; low coefficient of friction to permit easy operation; stable characteristics over a wide temperature range; a fair degree of resiliency; easy to handle and simple to use; and economically available. While these requirements may at first appear rigorous, it has been found that one of the fluorocarbon plastics, i.e., polytetrafluoroethylene sold by E. I. duPont de Nemours. Incorporated, under the trademark "Teflon," satisfactorily fulfills the above requirements and provides a usable material for the seat C. Depending upon the size, lading to be carried, and pressure rating, the seat C may be formed of other materials including other fluorocarbon plastics such as polychlorofluoroethylene (sold under the trademark "Kel-F" by the Minnesota Mining and Manufacturing Corporation), Nylon, other plastics, hard rubber, etc. In some instances, it may be desirable to compound the above materials with fillers, such as asbestos, glassfiber, dry lubricants, etc.

Each seat member C is in the form of an annular ring having parallel side walls 70—70, a straight axial rear wall 72, and a tapered front surface 74 which opposes the valve member B. Each seat member C has a lesser radial thickness, i.e., the distance between the side walls 70—70, than the radial thickness of the groove. The inner and outer circumferential walls 70 of the seat member are of such dimension relative to the dimension of the inner and outer circumferential groove walls that clearance is defined between each of the walls 70—70 of the seat member C and the side walls of the groove 66, see FIG. 2. It has been found that if there is a clearance of approximately .010" between the wall of the groove and the walls of the seat, that is, having the inner diameter of seat .020" greater than the inner diameter of the groove and the outer diameter of groove .020" greater than the outer diameter of the seat, there will be a marked reduction in torque. In a 2" (two inch) valve, it was found that with the above-described .010" clearance the initial breaking torque was approximately one-half that required for the same valve in which the seat had no clearance. The operating torque was only one-third that required for the no-clearance situation. Benefits will be achieved even when the clearance is reduced to .0025" on each side.

At no time is there contemplated metal-to-metal contact between the valve member and the end members. Upon initial assembly of the valve, the seat members C—C will be under slight longitudinal compression sufficient only to establish an initial seal between the valve member and seat members. This will cause a small amount of longitudinal bulging of the seal members (FIG. 3). With the valve closed and under maximum rated pressure, the valve member will be forced downstream and the entire line pressure force will be absorbed by the downstream seat member causing it to bulge or deform under compression as a columnar spring until the side walls 70—70 are in tight engagement with the inner and outer walls of the groove. Under this condition, the sealing member will be supported longitudinally simultaneously by the inner and outer cylindrical walls of the groove and any tendency of the seats to be subjected to lateral bending is effectively eliminated. All of the seat deformation is, therefore, caused by direct compression between the valve member and the seat members.

The tapered surface 74 of the seat member extends beyond the taperingly diverging portion 64 of the end member. Each end member extends into the central body an amount sufficient to force the surface 74 into intimate sealing contact with the valve member B. Since the seat member C, except for the portion 74, is essentially confined a relatively high unit load can be placed on the seat C without undue distortion. The amount of deformation of each seat member C is limited so that the seat member C does not completely fill the groove 66 either on assembly or during operation of the valve at full rated pressure, see FIG. 3. For valves up to 6", the interference is preferably between .005"–.012". Since the seat member C does not fill the groove 66, the seat member C does not hydrostatically lock but rather acts as a columnar spring. As a result, the torque necessary to operate the valve is markedly reduced. Even though the valve member B is free floating and will float against the downstream seat C causing the downstream seat to carry the total load developed by line pressure, the seat member C is so proportioned that through rated pressure it will not fill the groove 66 and hydrostatically lock. The valve is so designed that the amount of interference between the seat C and valve member B can be carefully regulated. The amount of entry of the end members into the central housing is predetermined and their entry limited by the flange 54 contacting the end of the central housing 10. The desired interferences can be controlled by regulating the amount that the portion 70 extends beyond the tapered surface 64. With such construction, the amount of interference between the seats C—C and valve member B can be predicted and the minimum turning torque for any pressure rating can be built into the valve. As long as the seat does not completely fill the groove 66 and hydrostatically lock and the forces developed do not exceed the compressive yield strength of the material forming the seat, there is a columnar spring action which will give a resiliency that will keep torque down. Also, there will be a built-in reservoir for seat wear.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What I claim is:

1. A rotatable spherical plug valve comprised of a valve body having a bore extending therethrough; a spherical valve member positioned in the bore, said spherical valve member having a port, the axis of which is alignable with the axis of the bore in the open position of the valve; an aperture in the valve body; a stem having an inner end engaged with the valve member and an axially outer end which extends through said aperture in the body; means forming a seal between said aperture and said stem; detachably connected end members extending into each end of the body bore, each end member having means which limits entry of the end member into the body a predetermined amount, each end member having a passage with which the port in the valve member can be aligned to form the run of the valve and an axially inner end having a portion taperingly diverging axially outward from the passage, an annular groove in the taperingly diverging portion of the axial inner end; each annular groove having inner and outer cylindrical walls disposed in coaxial relation with the respective passage and having an end wall disposed in substantially normal relation with the cylindrical walls; an annular seat member of deformable material positioned in each of said grooves, each seat member being of a lesser radial thickness than the radial thickness of its groove so that in the uncompressed condition there is substantial clearance between the seat member and groove along the entire length of both the inner and outer circumferences of the groove, each seat member having a portion extending beyond the surface of said taperingly diverging portion terminating in a tapered surface to oppose the spherical surface of the valve member, each end member extending into the body bore an amount sufficient to force the seat members into intimate sealing contact with the spherical surface of the valve member upon assembly thereby deforming the seat members a limited amount so that the seat members do not completely fill the groove either during assembly or operation within rated pressure, whereby said seat members act as a columnar spring against the spherical valve member.

2. A plug valve, as recited in claim 1, said cylindrical walls of the seat members upon assembly being deformed to engage the cylindrical walls of the groove intermediate the ends thereof.

3. A rotatable spherical plug valve comprised of a valve body having a bore extending therethrough; a spherical valve member positioned in the bore, said spherical plug member having a port, the axis of which is alignable with the axis of the bore in the open position of the valve; an aperture in the valve body; a stem having an inner end engaged with the valve member and an axially outer end which extends through said aperture in the body; means forming a seal between said aperture and said stem; detachably connected end members extending into each end of the body bore, each end member having means which limits entry of the end member into the body a predetermined amount, each end member having a passage with which the port in the valve member can be aligned to form the run of the valve and an axially inner end having a portion taperingly diverging axially outward from the passage, an annular groove formed in each of said taperingly diverging portions, each annular groove having cylindrical side walls which are parallel one with the other and parallel with the passage of the end member in which the groove is formed, an annular seat member of deformable material positioned in each of said grooves, each seat member being of a lesser radial thickness than the radial thickness of the groove so that there is clearance between the seat member and groove, each seat member having a portion extending beyond the surface of said taperingly diverging portion terminating in a tapered surface to oppose the spherical surface of the valve member, each end member extending into the bore an amount sufficient to force the seat members into intimate sealing contact with the spherical surface of the valve member and deforming the seat members a limited amount, the deformation being such that the seat members do not completely fill their respective grooves on assembly and the amount of clearance between each seat and its groove being such that the seat members do not completely fill the grooves during operation, whereby the seat members act as a columnar spring against the spherical valve member.

4. A valve comprising a valve body defining a valve chamber and having inlet and outlet passages in communication with the valve chamber, a valve member disposed within the valve chamber and being movable between open and closed positions to control the flow of fluid through the valve, means for imparting movement to the valve member, an annular groove formed in the valve body about each of the inlet and outlet passages, each of the grooves having inner and outer substantially cylindrical circumferential walls disposed in parallel relation with the inlet and outlet passages, a seat member of deformable material disposed in each of the annular grooves, each of the seat members having inner and outer cylindrical circumferential walls which are of substantially different diameters than the respective circumferential walls of the groove so that substantial internal and external circumferential clearances will exist between the seat member and the groove along the entire axial length thereof in the uncompressed state of the seat members, the seat members being of substantially greater length than the depth of the grooves and having a face portion thereof disposed for intimate sealing engagement with the valve member, the seat members when assembled into the valve each being initially distorted axially by compression causing the cylindrical surfaces thereof to flex and to establish limited supporting engagement with the respective circumferential wall of the groove intermediate the axial ends of said circumferential groove walls, the downstream one of said seat members being further distorted by the force of the valve member under line pressure to establish a greater area of supporting contact between the seat member and the groove walls, at conditions of maximum seat member distortion the downstream seat member absorbing the full load of the valve member and yet not entirely filling the groove, whereby said seat members act as a columnar spring against said spherical valve member.

5. A valve comprising a valve body defining a valve chamber and having inlet and outlet passages in communication with the valve chamber, a valve member disposed within the valve chamber and being movable between open and closed positions to control the flow of fluid through the valve, means for imparting movement to the valve member, an annular groove formed in the valve body about each of the inlet and outlet passages, each of the grooves having inner and outer substantially cylindrical circumferential walls disposed in parallel relation with the inlet and outlet passages and having a generally planar bottom wall disposed in substantially normal relation with the circumferential walls, a seat member of deformable material disposed in each of the annular grooves, each of the seat members having inner and outer cylindrical circumferential walls which are of substantially different dimensions than the respective circumferential walls of the groove so that substantial internal and external circumferential clearances will exist between the seat member and the groove along the entire axial length thereof in the uncompressed state of the seat members, the rear portion of each of the seat members being planar and disposed in normal relation with the inner and outer circumferential surfaces and will be in intimate contact with the planar surface of the groove, the seat members being of substantially greater length than the depth of the grooves and having a face portion thereof disposed for intimate sealing engagement with the valve member, the seat members when assembled into the valve each being initially distorted axially by compression causing the cylindrical surfaces thereof to flex and to establish limited supporting engagement with the respective circumferential wall of the groove intermediate the axial ends of said circumferential groove walls, the downstream one of said seat members being further distorted by the force of the valve member under line pressure to establish a greater area of supporting contact between the seat member and the groove walls, at conditions of maximum seat member distortion the downstream seat member absorbing the full load of the valve member and not entirely filling the groove, whereby the seat members act as a spherical valve member.

No references cited.

M. CARY NELSON, *Primary Examiner.*